July 1, 1969 SHŪICHI AMANO ET AL 3,453,650

TIME SIGNAL GENERATOR

Filed March 10, 1967 Sheet 1 of 4

INVENTOR.

BY Shuichi Amano
Tetsujiro Ozono
Frank Montague
Attorney

Fig. 2
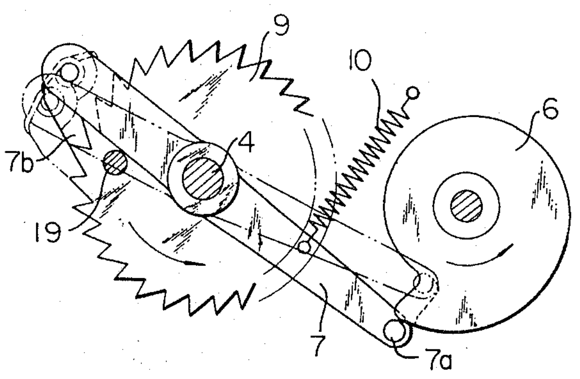
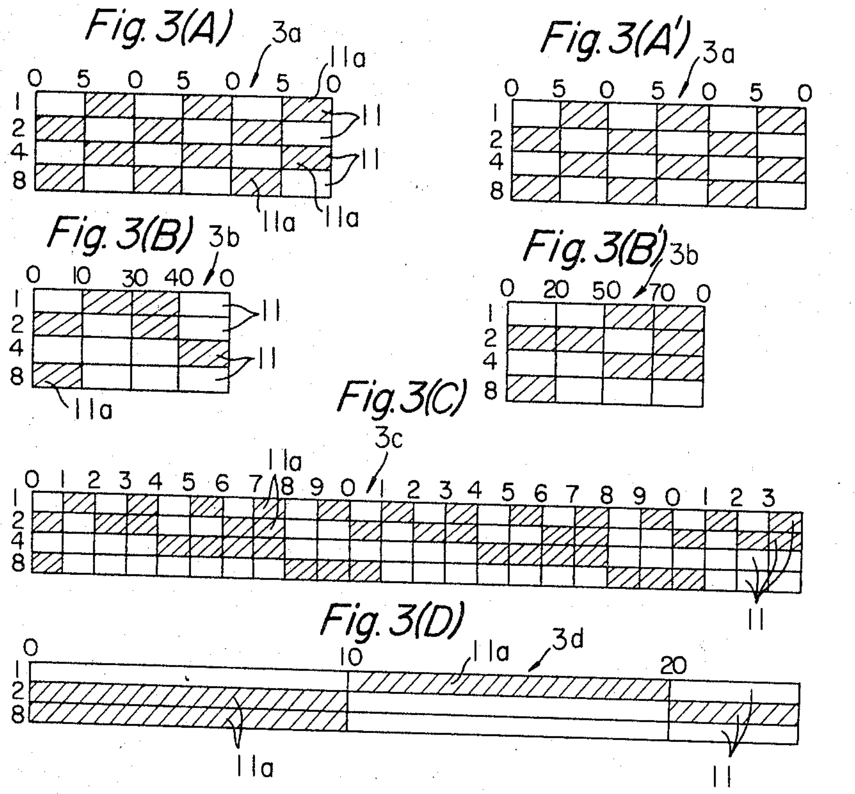
Fig. 3(A) Fig. 3(A') Fig. 3(B) Fig. 3(B') Fig. 3(C) Fig. 3(D)
INVENTORS
BY
Attorney INVENTORS
Shuichi Amano
Ebrujiro Ogawa
BY
Zumeit Georgelague
Attorney INVENTORS
Shuichi Amano
Tetsujiro Izone
BY Kenneth Kantage
attorney

United States Patent Office 3,453,650

Patented July 1, 1969

3,453,650

TIME SIGNAL GENERATOR

Shuichi Amano, Yokohama-shi, and Tetsujiro Ozono, Tokyo, Japan, assignors to Amano Corporation, Kanagawa-ken, Japan Filed Mar. 10, 1967, Ser. No. 622,352

Claims priority, application Japan, Aug. 23, 1966, 41/54,980

Int. Cl. G01d *15/04*

U.S. Cl. 346—79 2 Claims

ABSTRACT OF THE DISCLOSURE

A time signal generator comprises a plurality of cam drums secured to an input shaft which is driven by a motor or any other prime mover by means of an intermittent driving mechanism. Each of the cam drums is provided with a cam switch for the control of the on or off position and by connecting the cam drums through a scanning switch to the operation coil of a tape punching device on the output side. The time punch code corresponds to the hour and minute of the time which is punched on the tape.

The present invention relates to a time signal generator, in general, and to an improved time signal generator for a time recorder in particular.

It is one object of the present invention to provide a time signal generator, wherein when, for example, a time card B having an identification punch code A for an employee, is inserted into a time record E. The time recorder reads the identification punch code A, transforms it into an electric signal and sends it to a tape punching machine F which is adapted to punch, at the tape punching machine, a punch code A′ which is equivalent to the identification punch code A, and which is readable by an electronic computer, onto the tape C and thereafter, the time punch code D is punched representing the time when the time card B is inserted into the time recorder E.

It is another object of the present invention to provide a time signal generator, wherein a number of cam drums are secured in order through a carry mechanism to an input shaft driven by a motor or other prime mover through an intermittent drive mechanism. Each of the cam drums are provided with a cam switch by which "on" or "off" is controlled. They are connected through a scanning switch to the operation coil of the tape punching machine on its output side, whereby the time punch code corresponding to the hour and minute is punched on the tape.

With these and other objects in view, which will become apparent in the following detailed description, the present invention will be clearly understood in connection with the accompanying drawings, in which:

FIG. 2 is a section along line II—II of FIG. 1;

Figure 4:
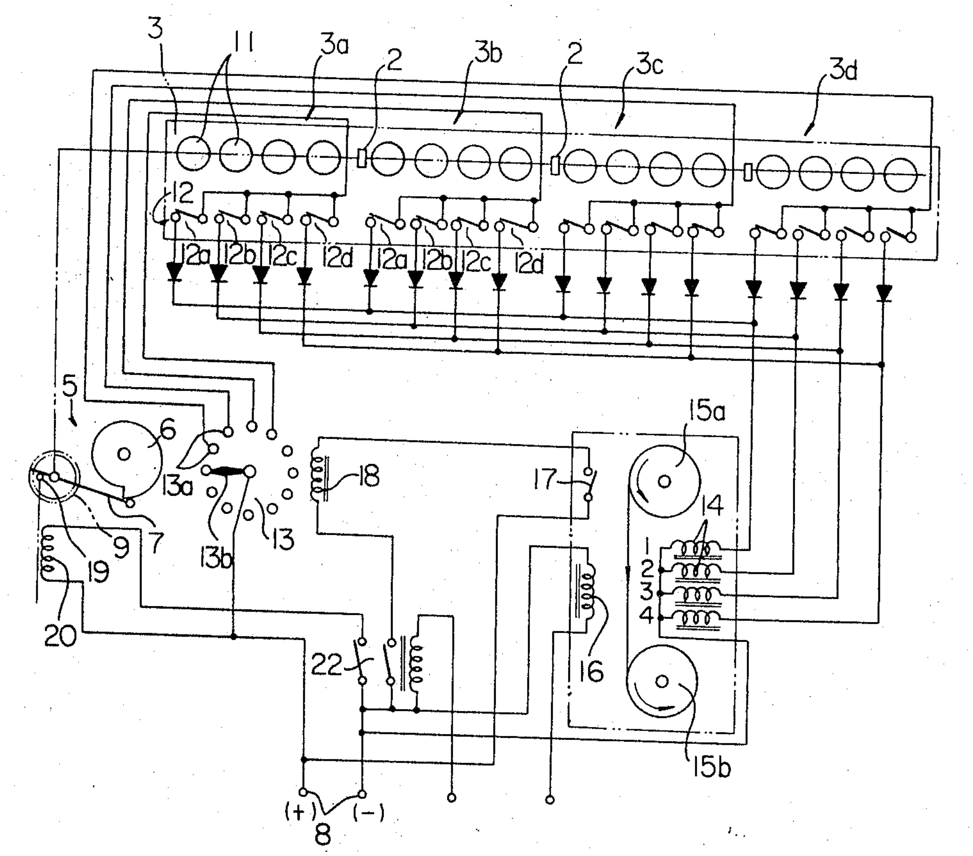
Figures 5, 6, 7:
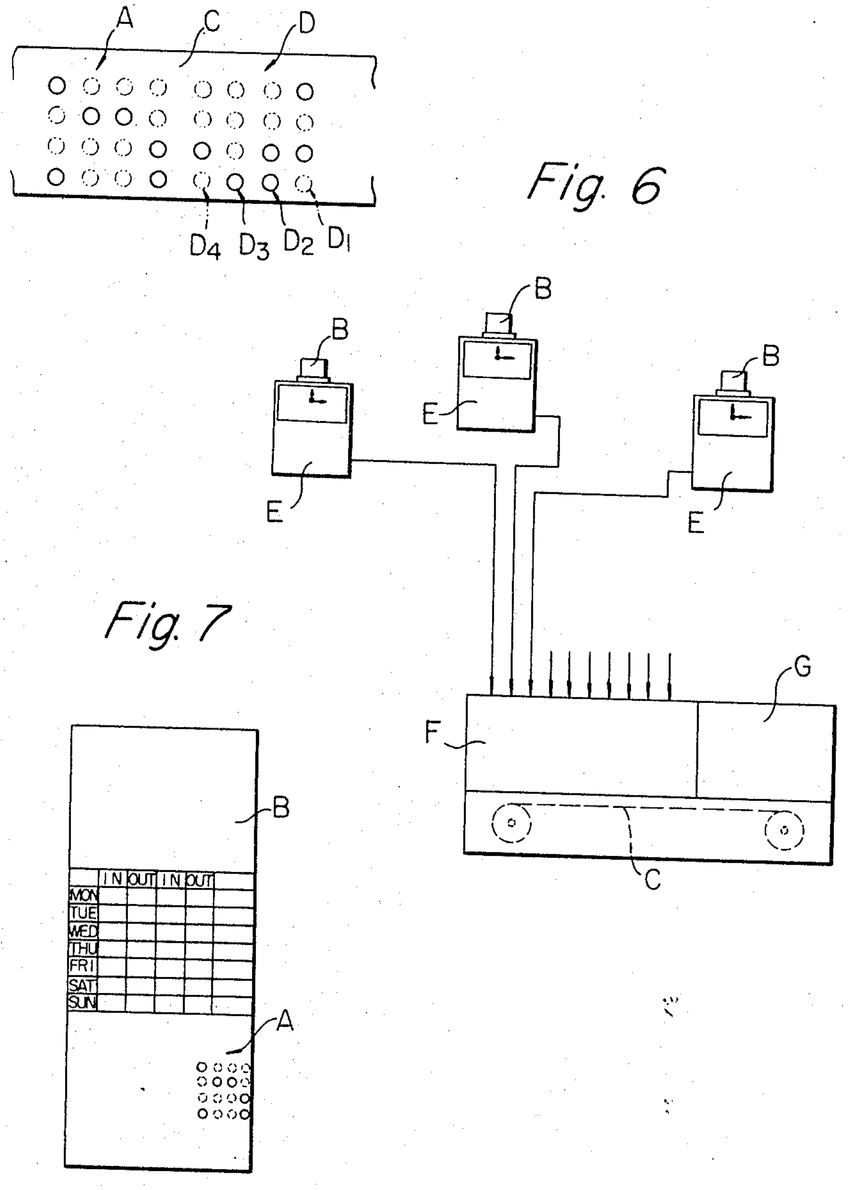

FIGS. 3(A), (A′), (B), (B′), (C) and (D) denote expansion views of each cam drum;

FIG. 4 is an entire schematic circuit diagram;

FIG. 5 is a fragmentary front elevation of one embodiment of the tape;

FIG. 6 is a wiring diagram of time recorders with the tape punching machine for use with the present invention; and FIG. 7 is a front elevation of an embodiment of a card, for example, used by an employee to punch the time thereon.

Figure 1:
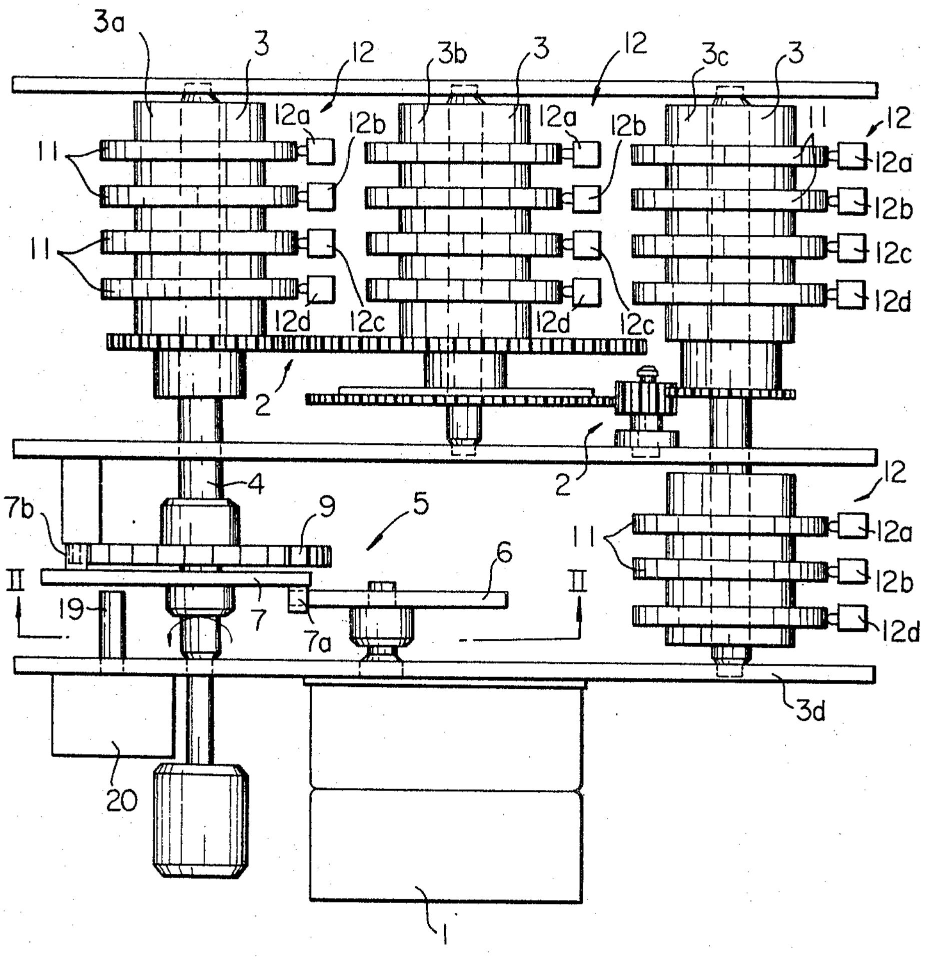
FIG. 1 is a sectional view of an embodiment of the present invention.

Referring now to the drawings, and more particularly to FIGS. 1 and 2, a prime mover 1 is illustrated comprising a synchronous motor and a number of cam drums 3. The first to the fourth cam drums 3*a*, 3*b*, 3*c* and 3*d*, respectively, are connected in order through a respective carry mechanism 2, to the input shaft 4 which is connected to its output side through an intermittent driving mechanism 5. Therefore, an intermittent driving corresponding to the hour and minute of the time is given to each drum.

The intermittent driving mechanism 5 is formed such that an oscillating arm 7 which is pulled to one side by a spring 10 (FIG. 2) is engaged, via a roller 7*a* at one end of the arm, to a cam 6 fixed to the output shaft of the synchronous motor 1 and via a pawl 7*b* at the other end of the arm 7 engages a rachet wheel 9 on the input shaft 4 so that the oscillating arm 7 oscillates by the rotation of the cam 6 and the input shaft is intermittently driven.

Each cam drum 3 is provided with four cams 11 corresponding to the numerical values 1, 2, 4 and 8 respectively on the periphery in its axial direction. In a number of columns in the direction of its circumference are four cam switches 12. The first to the fourth cam switches 12*a*, 12*b*, 12*c* and 12*d*, respectively, are arranged facing the circumference, and are closed selectively by projections 11*a* of the cams 11. The signals corresponding to the closing of the cam switches are obtained at their output sides.

Referring now again to the drawings, and in particular to FIG. 3, each cam drum 3 is shown in its expanded form. FIG. 3(A) denotes the first cam drum 3*a* which rotates once every thirty minutes and represents the first order of the minute. The periphery of this cam drum is divided into six equal parts in its circumferential direction and in each column, the zero minute and the five minute are indicated alternately. That is, the zero minutes are represented by two projections 11*a* shown by hatched portions in FIG. 3(A) provided in the second and fourth positions corresponding to the numbers 2 and 8 respectively. The five minutes are represented by two projections 11*a* provided in the first and third positions corresponding to the numbers 1 and 4 respectively and hatched respectively. The zero and five minutes are arranged alternately. Thus, at the zero minute, the second and fourth cam switches 12*b* and 12*d* are closed, and at the five minute, the first and third ones are closed.

FIG. 3(B) denotes the second cam drum which rotates a quarter when the first cam drum rotates a half, that is a quarter an hour and represents the second order of the minute, the periphery of which is divided into four equal parts and the respective parts indicate the zero minute, the ten minute, the thirty minute and forty minute by the sexagesimal notation. That is, at the zero minute, projections 11*a* are provided in the second positions corresponding to the numerical value of 2 and the fourth position corresponding to the numerical value of 8; at the ten minute, at the first position corresponding to the numerical value of 1; at the thirty minute, at the first and second positions corresponding to the numerical value of 1 and 2; at the forty minute, and at the third position corresponding to the numerical value of 4. Thus, at the zero minute, the second and fourth cam switches 12*b* and 12*d* are closed; at the ten minute the first cam switch (12*a*); at the thirty minute the first and second cam switches 12*a* and 12*b*; and at the forty minute the third cam switch 12*c*. Thus, the time with every zero, fifteen, thirty and forty five minutes is represented by both the first and second cam drums 3*a* and 3*b*.

FIG. 3(B′) denotes another example of the second cam drum 3*b*, showing the case where the second order of the minute is expressed by the centumal notation and the projections 11*a* representing zero, twenty, fifty and seventy are provided respectively in the direction of the axis. Thus, the second cam drum 3*b* coupled with the first cam drum 3*a* represents 0, 25, 50 and 75 which are made by dividing an hour into four equal parts.

FIGS. 3(C) and (D) denote expansion views of the third and fourth cam drums 3*c* and 3*d* which rotate one twenty fourth during one rotation of the second cam drum 3*b*, that is, rotate once per twenty four hours and they are mounted on a same shaft.

As in the cases of the first and second cam drums, the third cam drum is provided with cams 11 at the positions corresponding to the numerical values of 1, 2, 4 and 8 in the axial direction and these are divided into twenty four equal parts in the circumferential direction and the projections 11*a* are provided at the respective corresponding positions, representing the hour from zero to nine, from zero to nine and from zero to three. The fourth cam drum 3*d* is provided with the projections 11*a* at the positions corresponding to the hour from zero to nine of the first column of the third cam drum 3*c*, the hour from zero to nine of the second column of the third cam drum 3*c* and the hour from zero to three of the third cam drum 3*c*, and represent zero hour, ten hour and twenty hour, respectively. Thus, the third cam drum 3*c* coupled with the fourth cam drum 3*d*, represents both the first and the second orders of the hour. Further, as the fourth cam drum 3*d* is sufficient to be able to express 0, 1 and 2, the cam 11 of the third position of the numerical value of 4 and the cam switch corresponding to this are omitted. For each cam drum 3, that is, from the first to the fourth cam drums 3*a*, 3*b*, 3*c* and 3*d*, the cam switches 12*a*, 12*b*, 12*c* and 12*d* are connected in common at their input sides to the respectively corresponding contacts 13*a* of the rotatable scanning switch 13 and at the same time, the output side is connected to the common, corresponding to the numerical values of 1, 2, 4 and 8 of each cam drum 3 and the punching coils 14 of the tape punching machine are connected with each terminal.

Referring now again to the drawings, and in particular to FIGS. 4–7, the tape C on which the time punch code D is to be punched by the operation of the punching coils 14 is moved from the reel 15*a* to the other reel 15*b* intermittently by the input signals. That is, the input signals are given by a train of pulse signals which cause a time recorder E (FIG. 6) to oscillate, upon, for instance, the insertion of a time card B, by which the magnet for rotating the reel 15*b* is intermittently magnetized, causing the tape to move intermittently. A rotating scanning switch 13 is provided with a drive magnet 18, to which a switch 17 which is to be closed intermittently simultaneously with the movement of the tape C, is connected in series, and is connected to the power supply 8.

Thus, when a shift of one frame is given to the tape C by the first pulse of the input signal, a movable contact 13*b* of the rotating scanning switch 13 is advanced one contact simultaneously with the shifting of the tape C. Accordingly, through the contact 13*a*, current flows through any closed switch 12*a*, 12*b* or 12*d* of the fourth cam drum 3*d* and a punching coil 14 corresponding to the closed switch is operated and a punch code $D_4$ of the second order of the hour is punched on the tape C. Subsequently, with the income of the second pulse signal, as in the case of the first pulse, a shift of one frame is given to the tape C and a movement of one contact is given to the rotating scanning switch 13. Therefore, current flows through any closed cam switches 12*a*, 12*b*, 12*c* and 12*d* of the third cam drum 3*c* and a punch code $D_3$ of the first order of the hour is punched upon the tape C.

In this way, similarly with the third and the fourth pulses, the punch codes $D_2$ and $D_1$ of the second and first orders of the minute are punched successively and as shown in FIG. 3, for instance, the time punch code D, that is, twenty one hour and thirty minutes is punched.

The synchronous motor 1 illustrated makes one revolution per minute and when the roller 7*a* of the oscillating arm 7 moves upwards from the projection of the cam 6 on the output shaft by spring 10, the oscillating arm is caused to incline leftwards and an intermittent drive is provided to the input shaft 4 of the first cam drum 3*a*.

Therefore, if a rotation is given to each cam drum 3 during the time the punch code D is being punched on the tape C by a train of pulse signal, the time recorder E would record a different time punch code D from the time when the card B is actually inserted.

Further, as shown in FIG. 6, when the time cards B are inserted into more than one time recorder simultaneously, differences between them may also occur in the time punch codes punched. Accordingly, while the equipment is working, that is, rotating scanning switch is operating, the leftward inclination of the oscillating arm is intercepted and the rotation of the cam drum 3 is stopped, so that the time punch code D of the time when the card has been inserted is punched upon the card. That is, along with the provision of a magnet 20 to the side surface of the oscillating arm 7 which causes the lever 19 to project when energized and intercept the leftward inclination of the arm, there is provided a relay contact 22 which is to be closed by the insertion of the time card B, both of which are connected in series to the power supply 8.

Thus, upon the insertion of the card B, the relay contact 22 is closed. Then the magnet 20 is operated and cause the lever 19 to project and to prevent the leftward inclination of the oscillating lever 7. In this way, the rotation of each cam drum 3 is prevented and the time punch code D of the time when the card B was inserted is punched.

Further, even when the cards B are inserted simultaneously into more than one time recorder E, the rotation of each cam drum 3 is stopped until the punching of the time punch code D of the same time for all the time cards is completed, because the relay contact 22 remains closed.

In accordance with the present invention, a number of cam drums are provided in succession through a carry mechanism and an intermittent rotation is provided to its input shaft by a motor or other prime mover through an intermittent drive mechanism; the cam switches mounted on each drum are scanned selectively in order by a scanning switch and cause the punching coil mounted on its output side, to operate; and the time punch code corresponding to the hour and the minute of the time is punched upon the tape. Therefore, it is possible to record the time upon the tape at any time as a time punch record. Thus, for instance, when used together with a time recorder, it is possible to record the time when the time card is inserted upon the tape. This is very convenient for the control of the working hours of employees by using an electronic computer.

While we have disclosed one embodiment of the present invention, it is to be understood that this embodiment is given by example only and not in a limiting sense, the scope of the present invention being determined by the objects and the claims.

What is claimed is:

1. A time recorder apparatus comprising:
a rotary shaft,
drive means for driving said rotary shaft,
encoding means for defining a digital code signal which is a function of the angular position of said rotary shaft,
recording means operable to form a permanent record of said digital code signal,
said encoding means comprises switch means for setting in a plurality of combinations to define said digital code signal,
said switch means comprises a plurality of groups of switch elements for defining digits of different significance in said digital code signal,
said recording means comprises,
means responsive for recording said code signal, and
sampling means for connecting said responsive means to said groups in succession and for actuating said responsive means.

2. The time recorder apparatus, as set forth in claim 1, wherein:

said responsive means comprises a tape punch apparatus.

References Cited

UNITED STATES PATENTS

| | | | |
|---|---|---|---|
| 2,988,269 | 6/1961 | Reichert | 346—50 X |
| 3,341,852 | 9/1967 | Kramer et al. | 346—14 |

| | | | |
|---|---|---|---|
| 2,687,936 | 8/1954 | Cooper et al. | 346—87 |
| 3,084,013 | 4/1963 | Brett | 346—89 |
| 3,325,820 | 6/1967 | Duffey et al. | 346—83 |

RICHARD B. WILKINSON, *Primary Examiner.*

J. W. HARTARY, *Assistant Examiner.*

U.S. Cl. X.R.

346—93